US005548828A

United States Patent [19]

Kozaki et al.

[11] Patent Number: 5,548,828

[45] Date of Patent: Aug. 20, 1996

[54] RDS AUDIO RECEIVER HAVING INTERRUPT MODE

[75] Inventors: Kengo Kozaki, Urawa; Nobuyuki Ohyachi, Ageo; Seiji Tanaka, Ohmiya; Akira Morisawa, Urawa; Tosiyuki Nakazaki, Malaysia Penang, all of Japan

[73] Assignee: Clarion Co., Ltd., Tokyo, Japan

[21] Appl. No.: 167,223

[22] Filed: Dec. 14, 1993

[30] Foreign Application Priority Data

Dec. 14, 1992 [JP] Japan .................................... 4-354036
Feb. 9, 1993 [JP] Japan .............................. 5-008994 U

[51] Int. Cl.$^{6}$ .................................................. H04B 17/02

[52] U.S. Cl. .................................... 455/161.2; 455/161.3; 455/166.2; 455/184.1; 455/186.1

[58] Field of Search ............................. 455/158.4, 154.2, 455/154.1, 160.1, 161.1, 161.2, 161.3, 166.1, 166.2, 168.1, 167.1, 179.1, 185.1, 186.1, 186.2, 58.1, 184.1; 341/20; 379/96; 348/734, 569, 570

[56] References Cited

U.S. PATENT DOCUMENTS

| | | | |
|---|---|---|---|
| 4,969,209 | 11/1990 | Schwob | 455/158.4 |
| 5,152,011 | 9/1992 | Schwob | 455/186.1 |
| 5,191,423 | 3/1993 | Yoshida | 348/569 |
| 5,239,681 | 8/1993 | Parnell et al. | 455/186.1 |
| 5,239,700 | 8/1993 | Guenther et al. | 455/186.2 |
| 5,276,909 | 1/1994 | Milner et al. | 455/186.1 |
| 5,345,606 | 6/1994 | Duckeck et al. | 455/186.1 |

FOREIGN PATENT DOCUMENTS

| | | |
|---|---|---|
| 2301330 | 12/1990 | European Pat. Off. . |
| 0498233 | 1/1992 | European Pat. Off. . |
| 3743213 | 12/1987 | Germany . |
| 4031431 | 10/1990 | Germany . |

OTHER PUBLICATIONS

R.D.S. Radio Data System, Jul., 1989, European broadcasting union, Supplement 3 to Tech. 3244–E.

*Primary Examiner*—Andrew I. Faile
*Attorney, Agent, or Firm*—Koda and Androlia

[57] ABSTRACT

A Radio Data Systems (RDS) receiver has a decoder circuit to read RDS data from a broadcast transmission signal. From the RDS data, a control circuit determines a program of the received signal, a program category of the received signal, lists of programs and program categories of other stations, and a regional digit. The receiver has a controller to store a desired program category. The RDS data is used to control the receiver to perform several different functions. The receiver will interrupt reception of a signal, the category of which is different from a desired category and receive a signal that matches the desired category. The receiver will revert to a previous program when the category of the signal to which it switched no longer matches the desired category. The receiver will revert to the strongest signal having one of a specified set of regional digits. The receiver also permits the storage of a desired category using only an RDS key and at least one other key.

10 Claims, 9 Drawing Sheets

RDS AUDIO RECEIVER HAVING INTERRUPT MODE

BACKGROUND OF THE INVENTION

The present invention relates to radio receivers and specifically to radio receivers for receiving Radio Data System (RDS) broadcasts.

Radio Data System (RDS) broadcasts are special types of radio broadcasts that are widely implemented in Europe. RDS broadcast transmissions incorporate several types of information in addition to the audio content of the program that is broadcast.

Included in the incorporated information is a PTY (program type display) code. The PTY code is used to inform the listener of the general category of the program of the particular station to which an RDS receiver is tuned. For example, the category might be news, music, drama, educational, scientific, etc.

Another type of information incorporated in RDS signals represents the identity of the specific program being received. The program is identified by program identification codes (PI codes). At a given time, in a given receiving region, a number of broadcasters may be transmitting the same program at different receivable frequencies, each having the same PI code. At a given time different programs with different PI codes, each in the same category and thus having the same PTY code, could be airing simultaneously. RDS broadcasters may also transmit a list, called an AF list, which correlates the freqencies of RDS broadcasters and PI codes of the broadcasts at each frequency.

One feature that can be implemented in an RDS receiver is the PTY function. The PTY function shows, on a display, the category of the program being received. The display permits the user to select a station based on the general program content.

The additional equipment in RDS receivers for performing the PTY function serves no special purpose at times when no program in the selected category is broadcasting. For example, such recievers require a key switch for the PTY function. This requirement increases the number of keys and thereby the difficulty of operation.

OBJECTS AND SUMMARY OF THE INVENTION

An object of the present invention is to provide a Radio Data System (RDS) receiver that overcomes the drawbacks of the prior art.

Another object of the present invention is to provide an RDS receiver that makes additional active use of equipment for the Program Type Display (PTY) function to enhance the functionality of the receiver.

Still another object of the present invention is to provide an RDS receiver that can automatically tune to a station broadcasting a desired program.

Still another object of the present invention is to provide an RDS receiver that can automatically tune to a station broadcasting a desired general category of program.

Still another object of the present invention is to provide an RDS receiver that can automatically tune to a station transmitting the strongest signal.

Still another object of the present invention is to provide an RDS receiver with high operability, functionality and convenience.

Briefly stated, there is disclosed, a Radio Data Systems (RDS) receiver has a decoder circuit to read RDS data from a broadcast transmission signal. From the RDS data, a control circuit determines a program of the received signal, a program category of the received signal, lists of programs and program categories of other stations, and a regional digit. The receiver has a controller to store a desired program category. The RDS data is used to control the receiver to perform several different functions. The receiver will interrupt reception of a signal, the category of which is different from a desired category and receive a signal that matches the desired category. The receiver will revert to a previous program when the category of the signal to which it switched no longer matches the desired category. The receiver will revert to the strongest signal having one of a specified set of regional digits. The receiver also permits the storage of a desired category using only an RDS key and at least one other key.

According to an embodiment of the present invention, there is disclosed, an RDS receiver, comprising: means for receiving a broadcast transmission signal, the means for receiving including means for deriving a first audio signal from the broadcast transmission signal, means for determining a broadcast category of the broadcast transmission signal, controller means for storing a desired category, the controller means including means for activating an interrupt mode of the controller means, means for generating a second audio signal, the controller means including means for outputting the second audio signal and the controller means including means for outputting the first audio signal when the interrupt mode is activated and a desired category, stored in the controller means, matches the broadcast category of the broadcast transmission signal.

According to another embodiment of the present invention, there is disclosed, an RDS receiver, comprising: tuner means for receiving a broadcast transmission signal, the tuner means including means for deriving a first audio signal from the broadcast transmission signal, means for extracting a data signal from the broadcast transmission signal, the data signal including data indicating a broadcast program of the broadcast transmission signal, controller means for storing a desired program in a memory of the controller means, the controller means including input means for activating an interrupt mode of the controller means, means for generating a second audio signal, the controller means including means for outputting the first audio signal when the interrupt mode is activated and a desired program, stored in the memory, matches the broadcast program of the broadcast transmission signal.

According to still another embodiment of the present invention, there is disclosed, an RDS receiver, comprising: means for receiving broadcast transmission signals, means for monitoring a category of a first one of the broadcast transmission signals, controller means for storing a desired category, controller means including means for activating an interrupt mode of the controller means, the controller means including means for tuning the means for receiving to receive a first one of the broadcast transmission signals, the controller means including means for tuning the means for receiving to receive the second one of the broadcast transmission signals when the interrupt mode is activated and a stored desired category matches the first one category.

According to still another embodiment of the present invention, there is disclosed, an RDS receiver, comprising: means for receiving broadcast transmission signals, each having a category, controller means for tuning the means for receiving to receive a first one of the broadcast transmission signals, the controller means including means for storing a desired category, means for determining a category of at least another of the broadcast transmission signals by scanning a list of data derived from the first one, the controller means including means for activating an interrupt mode of the controller means, the controller means including means for tuning the means for receiving to receive the at least another when the interrupt mode is activated and a stored desired category matches the at least another category.

According to still another embodiment of the present invention, there is disclosed, an RDS receiver, comprising: means for receiving broadcast transmission signals, each of the broadcast transmission signal having a category, means for storing a desired category, controller means for monitoring a first broadcast transmission signal category and the controller means including means for scanning others of the broadcast transmission signal categories and the controller means including means for tuning the means for receiving to receive one of the others when the one category matches a stored desired category.

According to still another embodiment of the present invention, there is disclosed, an RDS receiver, comprising: means for storing a desired category, means for receiving broadcast transmission signals each having a program and a category, controller means for tuning the means for receiving to receive a first one of the broadcast transmission signals after receiving a second one of the broadcast transmission signals when the second one matching a stored desired category, the controller means including means for activating an interrupt mode of the controller means, means for deactivating the interrupt mode when the first one category changes, the controller means including means for confirming a receivability of the second one after the first one category changes and the controller means including means for subsequently tuning the means for receiving to receive the second one when the receivability is confirmed.

According to still another embodiment of the present invention, there is disclosed, a method for controlling a receiver, comprising the steps of: storing a desired category, generating a first audio signal from a first audio source, outputting the first audio signal, monitoring a category of a broadcast transmission signal, receiving the broadcast transmission signal and outputting a second audio signal derived from the broadcast transmission signal when the broadcast transmission signal category matches a stored desired category, continuing the outputting of the first audio signal when the broadcast transmission signal category is different from the desired category.

According to still another embodiment of the present invention, there is disclosed, a method for controlling a receiver comprising the steps of: storing a desired category, receiving a first broadcast transmission signal having a category, storing a frequency of the first broadcast transmission signal, monitoring a category of the broadcast transmission signal, determining categories of other broadcast transmission signals when the first broadcast transmission signal category is different from a stored desired category, receiving one of the other broadcast transmission signals and storing a frequency of the one of when the one of category matches the stored desired category, receiving the first broadcast transmission signal when all of the other broadcast transmission signal categories are different from the desired category.

According to still another embodiment of the present invention, there is disclosed, a method for controlling a receiver comprising the steps of: storing a desired category, receiving a first broadcast transmission signal containing encoded data indicating categories of other broadcast transmission signals, monitoring a category of the first broadcast transmission signal, continuing the receiving of the first broadcast transmission signal while the first broadcast transmission signal category matches a stored desired category, scanning the encoded data to determine if one of the other broadcast transmission signal categories matches the stored desired category and receiving the one of when the first broadcast transmission signal category is different from the desired category, displaying the stored desired category.

According to still another embodiment of the present invention, there is disclosed, a method for controlling a receiver comprising the steps of: storing a desired category, receiving a first broadcast transmission signal, monitoring a category of the first broadcast transmission signal, continuing to receive the first broadcast transmission signal while the first broadcast transmission signal category matches a stored desired category, consecutively receiving and checking categories of other broadcast transmission signals to determine if one of the other broadcast transmission signal categories matches the stored desired category when the first broadcast transmission signal category is different from the stored desired category, receiving one of the other broadcast transmission signals when the one of category matches the stored desired category and the first broadcast transmission signal category is different from the stored desired category; and displaying the stored desired category.

According to still another embodiment of the present invention, there is disclosed, a method for controlling a receiver, comprising the steps of: storing a desired category, receiving a first broadcast transmission signal, the first broadcast transmission signal having a program, storing the first broadcast transmission signal program, receiving a second broadcast transmission signal having a category matching a stored desired category, monitoring the second broadcast transmission signal category, continuing the receiving while the first broadcast transmission signal category matches the stored desired category, confirming a receivability of the first broadcast transmission signal when the first broadcast transmission signal category is different from the desired category, receiving the first broadcast transmission signal when the receivability is confirmed and receiving an alternative broadcast transmission signal when the first broadcast transmission signal when the receivability is unconfirmed.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
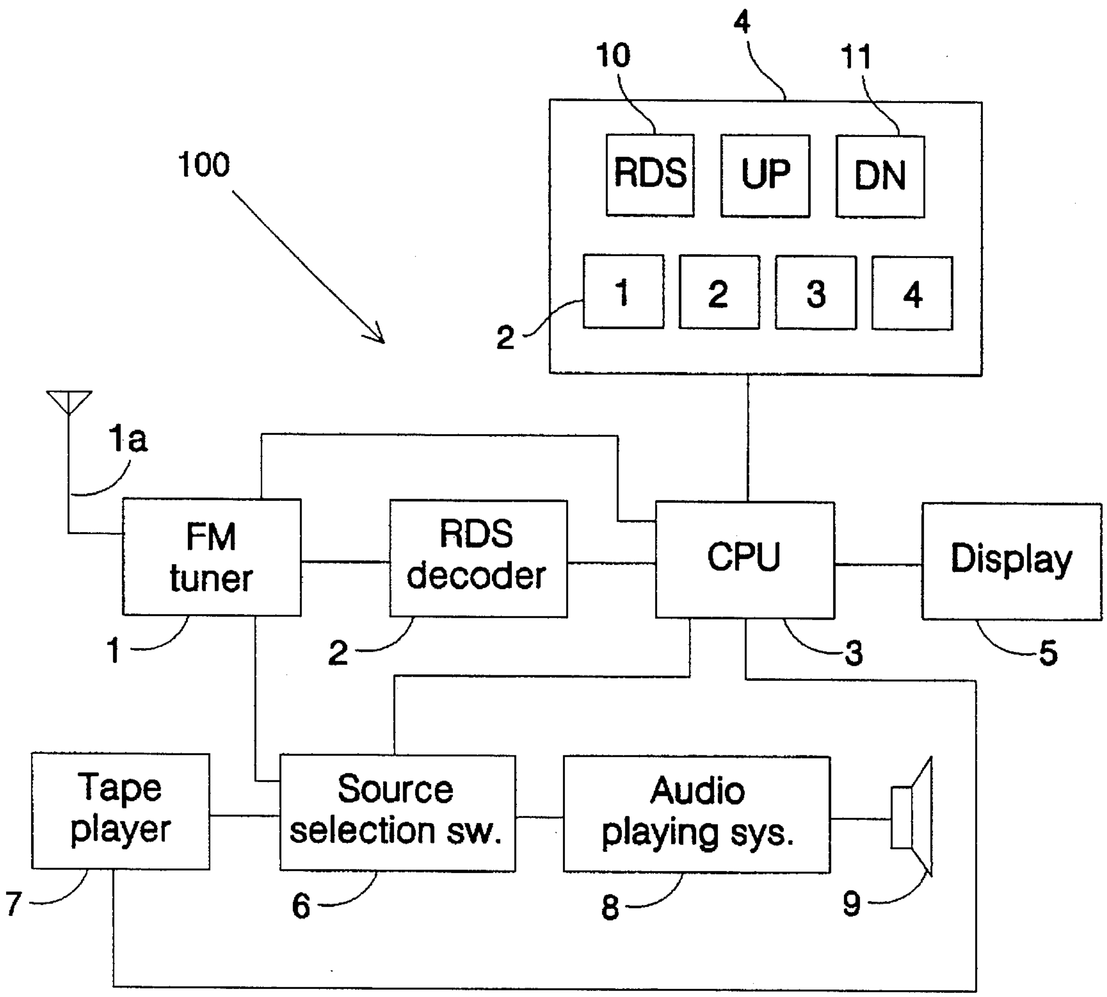
FIG. 1 is a block diagram of a Radio Data System (RDS) receiver according to an embodiment of the present invention.

Referring to FIG. 1, a Radio Data System (RDS) receiver 100 includes an FM tuner 1, with an antenna la, which receives an RDS broadcast transmission signal. An encoded RDS signal is derived from the RDS broadcast transmission signal by an RDS decoder 2. RDS decoder 2 outputs the RDS signal to a CPU 3. Command signals are sent to CPU 3 through a connected keyboard 4. Keyboard 4 includes an RDS key 10, a tune up/down key 11 and a preset key 12. CPU 3 outputs a variety of messages to a connected display 5.

An audio signal from FM tuner 1 is sent to a connected source selection switch 6. RDS receiver 100 contains a tape player 7 that sends an audio signal to source selection switch 6. Source selection switch 6 selects one of the audio signals from tape player 7 and FM tuner 1 for application to an input of an audio playing system 8. Audio playing system 8 demodulates and amplifies the selected audio signal to generate an output signal. The output signal of audio playing system 8 drives a speaker 9 to produce an audible signal. CPU 3 sends control signals to source selection switch 6 through a control line to control it. CPU 3 also sends control signals to tuner 1 through a control line to tune it to desired frequencies.

CPU 3 can support a function called program type display (PTY) which permits a user to select a desired category of program for listening. For example, the user may select one of news, music, drama, and educational categories. The RDS signal is a stream of RDS data derived from the RDS broadcast transmission signals by RDS decoder 2. These data are included in the RDS signal sent to CPU 3 by RDS decoder 2. Among the RDS data are PTY codes, which identify the program category of the RDS broadcast transmission being received by tuner 1.

To cause RDS receiver 100 to tune to a broadcast with a desired program content, the user makes a PTY item, which represents the desired program category, using display 5 and keyboard 4. A PTY standby mode is selected through keyboard 4, which causes CPU 3 to search for an RDS broadcast transmission signal bearing a PTY code corresponding to the PTY item selected. If CPU 3 finds a transmission bearing the correct PTY code, it will adjust tuner 1 to receive the transmission.

Figure 2:
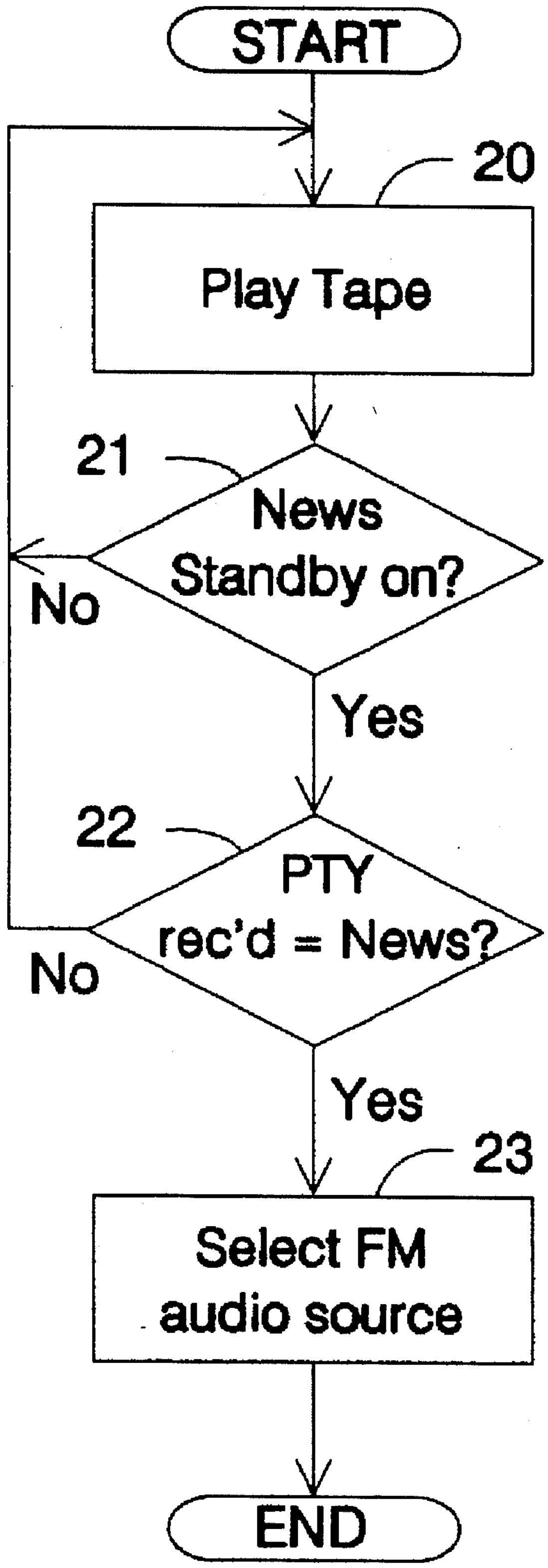
FIG. 2 is a flowchart showing a portion of the operating sequence of the receiver of FIG. 1 according to an embodiment of the present invention in which the receiver switches from a tape player source to an FM broadcast source if a PTY code indicates a desired category of broadcast is being received.

Referring to FIG. 2, if news is selected, for example, while tape player 7 is playing in step 20, CPU 3 first determines if a news standby operation was selected through keyboard 4 in step 21. If news standby operation was selected, the RDS data received by FM tuner 1 is checked in step 22. If the content of the broadcast being received is news, source selection circuit 6 is switched from tape player 7 to FM tuner 1 in step 23.

In some embodiments of the present invention CPU 3 automatically switches from the received RDS broadcast to a different broadcast based on a selected operating mode and certain criteria. These embodiments rely on Enhanced Other Network (EON) data to receive information regarding other networks. The EON data, which may be transmitted by RDS stations, provides information about the program content of other network stations besides the particular one being received. This data includes a list stations currently broadcasting, each correlated with a corresponding PTY code for the program being broadcast.

Figure 3:
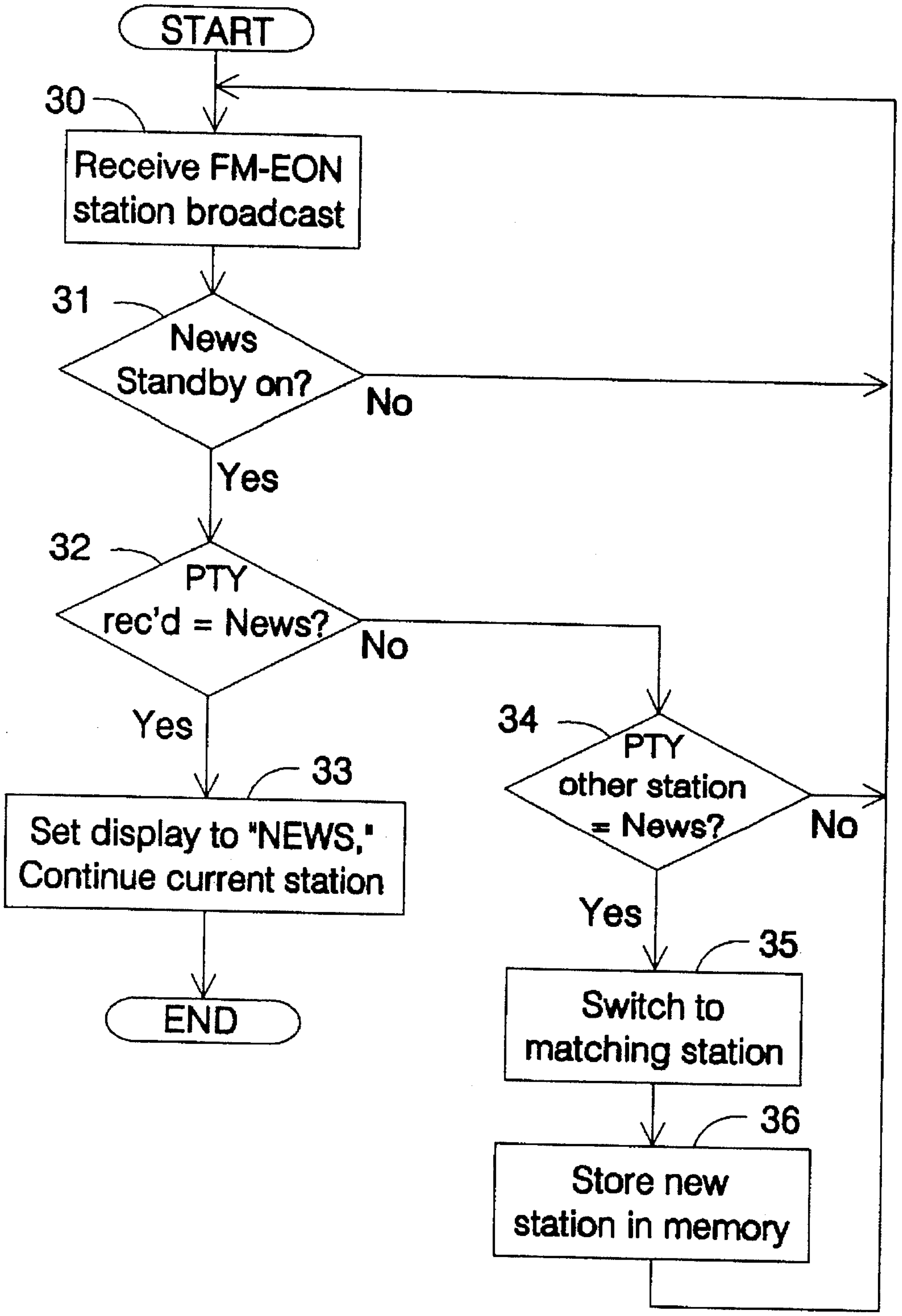
FIG. 3 is a flowchart showing a portion of the operating sequence of the receiver of FIG. 1 according to another embodiment of the present invention in which the receiver switches to a new station if the one being received does not match a selected PTY code.

Referring to FIG. 3, in step 30 a broadcast from a station providing EON data is received by tuner 1. Control then proceeds to step 31. If news standby mode is selected in step 31, control branches to step 32. If news standby mode is not selected, control returns to step 30. Step 32 branches to step 33 if the category of the broadcast being received is the same as the selected news category. In step 33, "NEWS" is shown on display 5, and the current station continues to be received. If the broadcast being received is not the same as the selected news category, control branches to step 34 where the EON data is scanned for another network with a matching program category. If a match is found, the corresponding station is tuned-in in step 35. In step 36, an identifier for the new station is stored in a memory. By permitting the selection of the PTY standby mode described above, this embodiment puts RDS key 10 to a use additional to its use in prior art RDS receivers, which is merely to activate the RDS display function.

Figure 4:
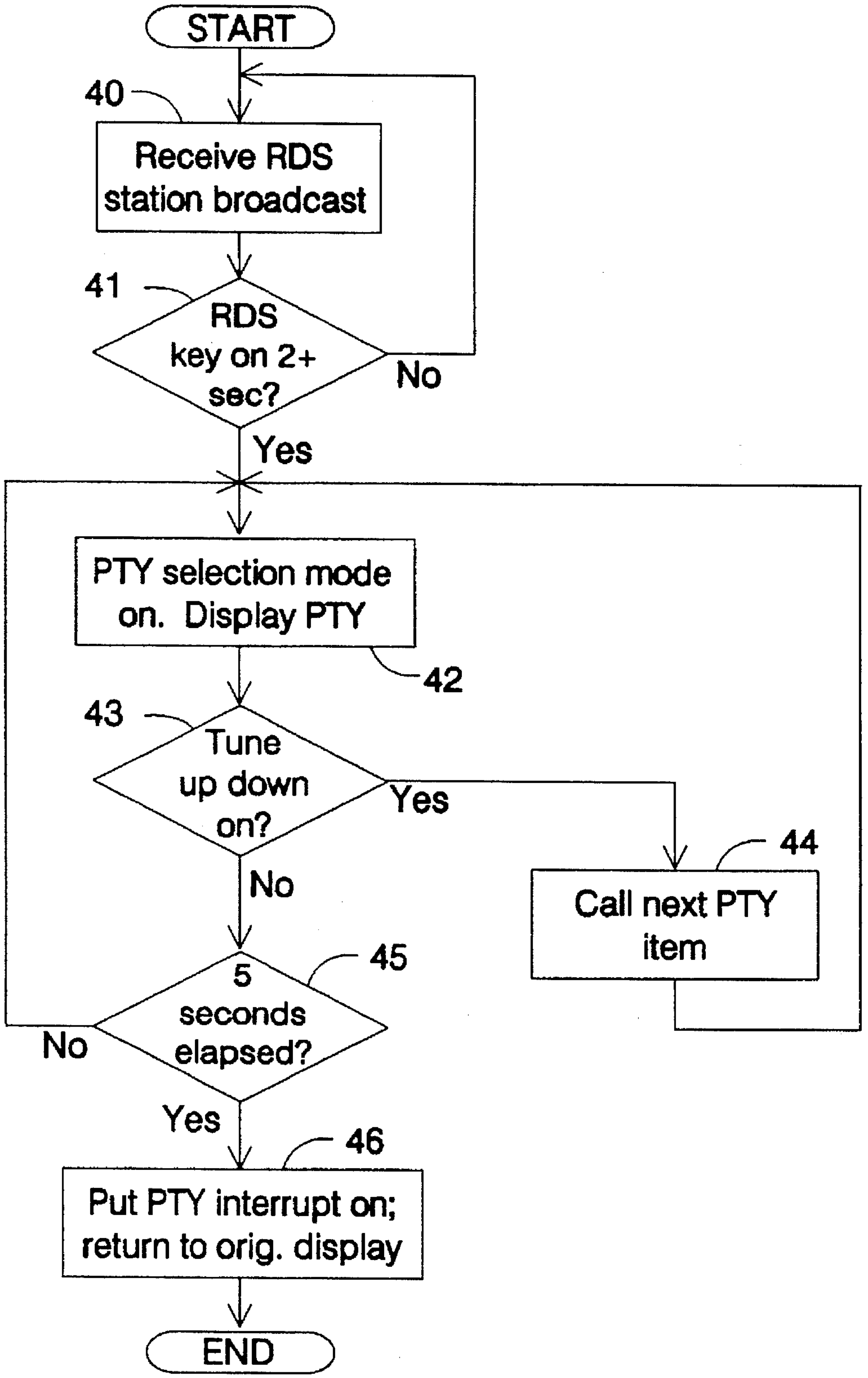
FIG. 4 is a flowchart showing a portion of the operating sequence of the receiver of FIG. 1 according to still another embodiment of the present invention in which a PTY category is selected by a user using key switches provided on the receiver.

Referring now to FIG. 4, an RDS broadcast is being received in step 40. Control proceeds to step 41. Step 41 branches to step 42 if RDS key 10 is pressed for at least a specified interval (two seconds in the present embodiment). If RDS key 10 has not been pressed for at least two seconds in step 41, control returns to step 40. In step 42, a PTY selection mode is activated and the PTY item displayed on display 5. Control proceeds to step 43 which branches to step 44 if tune up/tune down key 11 has been pressed or to step 45 if it has not. Step 45 returns to step 42 if 5 seconds have elapsed since the PTY selection mode was activated. Thus, control loops through 42, 43 and 45 until either 5 seconds pass, or tune up/tune down key 10 is pressed. If 5 seconds pass without the user pressing tune up/tune down key 10, control proceeds to step 46 where the PTY interrupt standby mode is activated and display 5 reverts to the original display.

In Step 44, a consecutive PTY item from a stored list of PTY items is called and displayed. Control proceeds back to step 42. If the desired PTY item was the last one to be displayed, it is selected when the five second period in step 45 runs out. If tune up/tune down key 10 is pressed, another PTY item is called up from the list and displayed. This process continues until a desired PTY item is selected by permitting the 5 second timer to run out. Note that this selection process requires no keys additional to those for setting the PTY standby mode.

Figure 5:
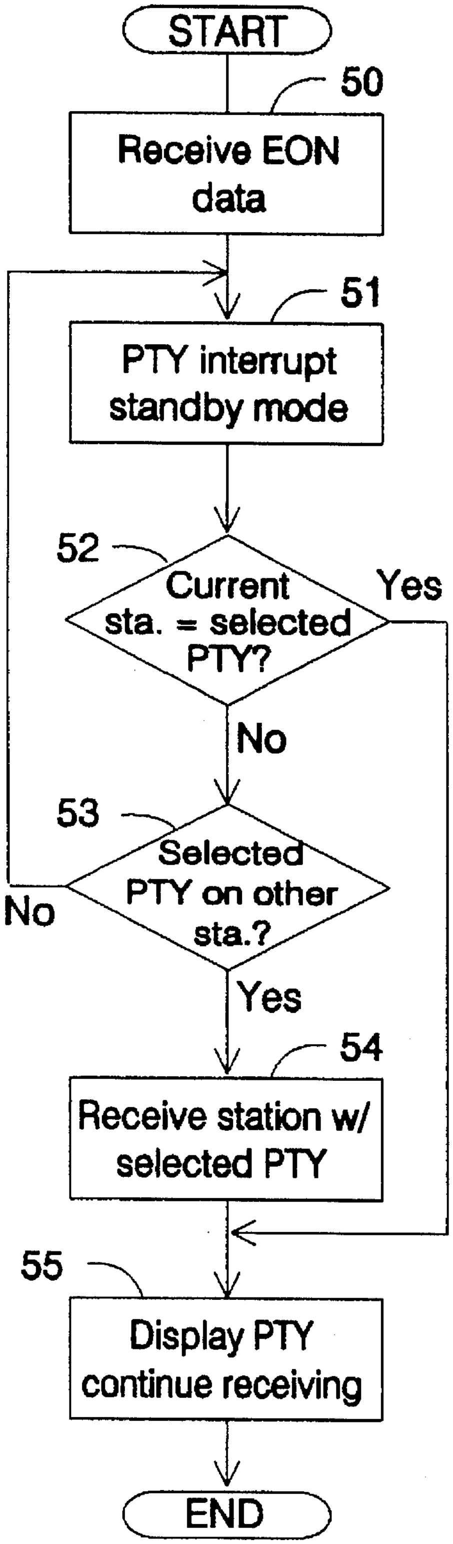
FIG. 5 is a flowchart showing a portion of the operating sequence of the receiver of FIG. 1 according to still another embodiment of the present invention in which the receiver switches to a new station if the one being received does not match a selected PTY code.

Referring to FIG. 5, an RDS broadcast containing EON data is received in step 50. Control proceeds to step 51 where a PTY item is selected and PTY standby mode initiated. Control then proceeds to step 52, which branches to step 55 if the current station matches the PTY selected, or to step 53 if the current station's PTY code and the selected PTY item do not match. In step 55 the selected PTY item is displayed and reception continued. Step 53 returns to step 51 if there is no other station in the EON link, i.e., there is no station in the list of stations whose PTY code matches the PTY item selected. If a matching station is found, tuner 1 is adjusted to receive the station in step 54. Control proceeds from step 54 to step 55 where the current PTY item is displayed and the current station is received.

Figure 6:
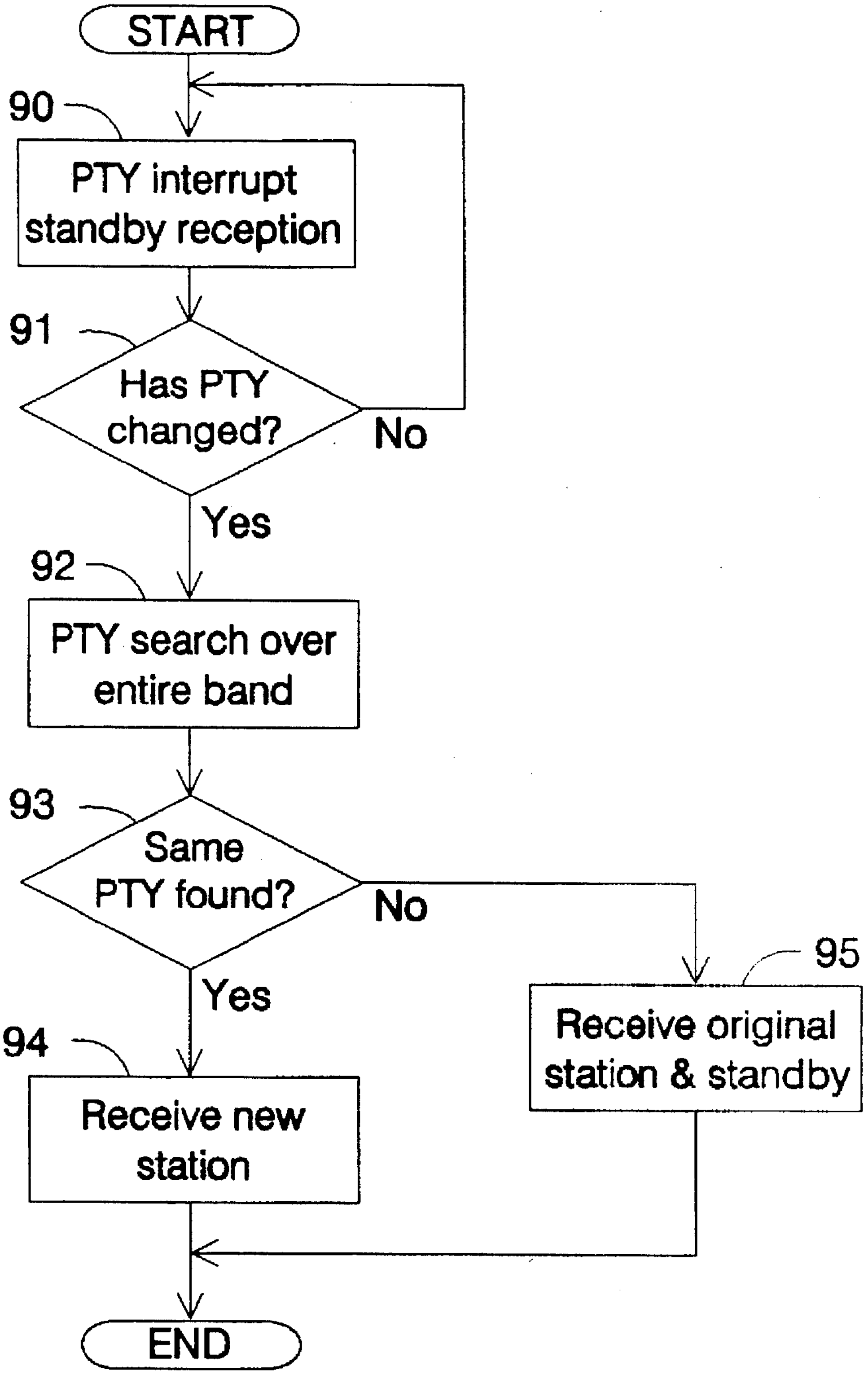
FIG. 6 is a flowchart showing a portion of the operating sequence of the receiver of FIG. 1 according to still another embodiment of the present invention in which the receiver searches the FM band for a broadcast whose PTY code is the same as a selected PTY code.

Referring to FIG. 6, PTY standby mode is active in step 90. Control proceeds to step 91 which branches to step 92 if the PTY code of the current station has changed. If the PTY code of the current station has not changed, control returns to step 90. In step 92, a search over the entire broadcast band is executed to find a station broadcasting a signal with a PTY code that matches the selected PTY code. After step 92, control proceeds to step 93 which branches to step 95 if no matching PTY code is found, or to step 94 if a match is found. In step 94, the station with the matching PTY code is received. In step 95, the original station is received and standby operation resumed.

Figure 7:
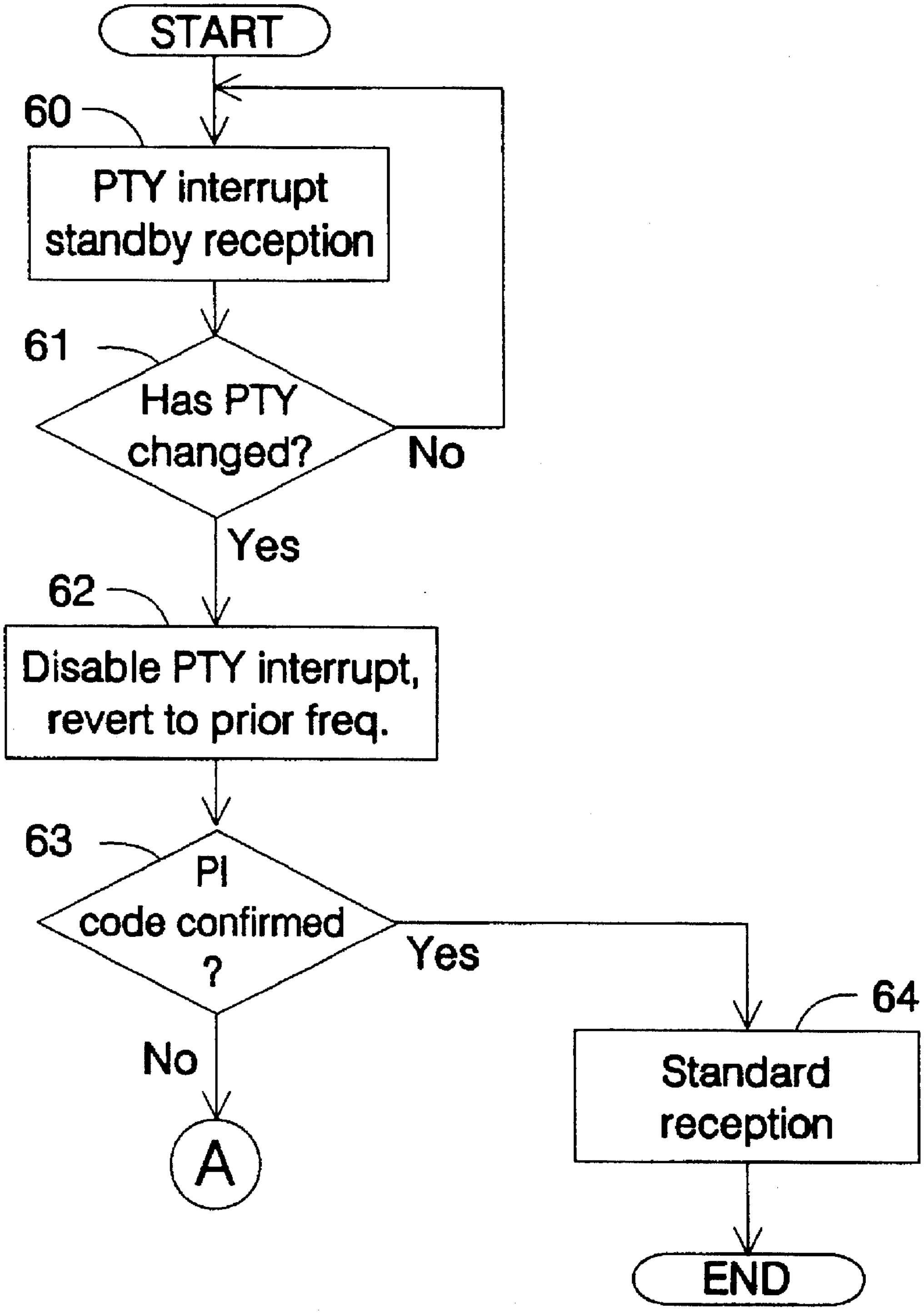
FIG. 7 is a flowchart showing a portion of the operating sequence of the receiver of FIG. 1 according to still another embodiment of the present invention in which the receiver switches to another station if the PTY code changes and determines if a PI code can be read from a station previously received.

Referring to FIG. 7, when PTY standby mode is activated in step 60, control proceeds to step 61. In step 61 it is determined if the PTY code of the program currently being received has changed. If the PTY code of the current station has changed, the PTY interrupt mode is disabled in step 62. If the PTY code of the current station has not changed, control returns to step 60. In step 62, the station that was current prior to the activation of the PTY interrupt mode is tuned in, and the PTY interrupt mode disabled, at step 62. The PI code of this station is checked in step 63 and, if the PI code can be read (confirmed), normal reception is activated. Failure to confirm the PI code indicates the signal quality is poor. When the PI code cannot be confirmed in step 63, control proceeds to either the embodiment shown in FIG. 8 or the embodiment shown in FIG. 9.

With the above control sequence, if during PTY interrupt mode reception, the original station's field strength changes due to travel or other causes, the tuner reverts to the station that was received prior to interrupt only when a PI code can be confirmed. Confirmation of the PI code is possible only when a good signal is being received. Thus, this control sequence assures that good reception is maintained by not reverting to the previous station when the PI code cannot be confirmed.

Figure 8:
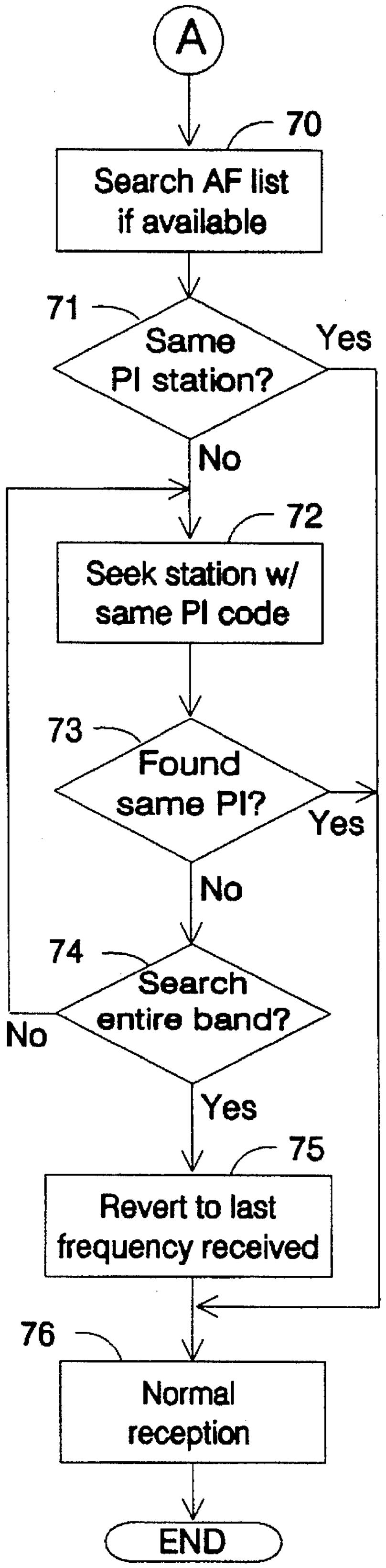
FIG. 8 is a flowchart showing a portion of the operating sequence of the receiver of FIG. 1 according to still another embodiment of the present invention in which the receiver searches for an alternative broadcast if it can't find one with an identical PI code.

Referring to FIG. 8, if there is an AF list, the AF list is searched in step 70. An AF list is an encoded list of stations indicating the programs being broadcast by each station. The AF list may be included in the RDS data. If a signal is found in step 71, which has a PI code identical to that of that of the station received prior to activation of the PTY interrupt mode, control proceeds to step 76 where that signal is received. If no match is found, a scan for an identical PI code is performed in steps 72, 73 and 74.

In step 72, the FM frequency band is scanned to find the frequency of the next receivable signal. In step 73, the PI code of that next receivable signal is compared to the PI code of the station selected prior to activation of the PTY interrupt mode. If a match is found, control branches to step 76 where the station with the matching PI code is tuned in. If no match is found control proceeds to step 74 which loops back to step 72 until the entire frequency band has been scanned and the corresponding PI codes of each signal checked. If no match is found after the scan of the entire band, the last frequency before the interrupt is and tuned in at step 75.

Figure 9:
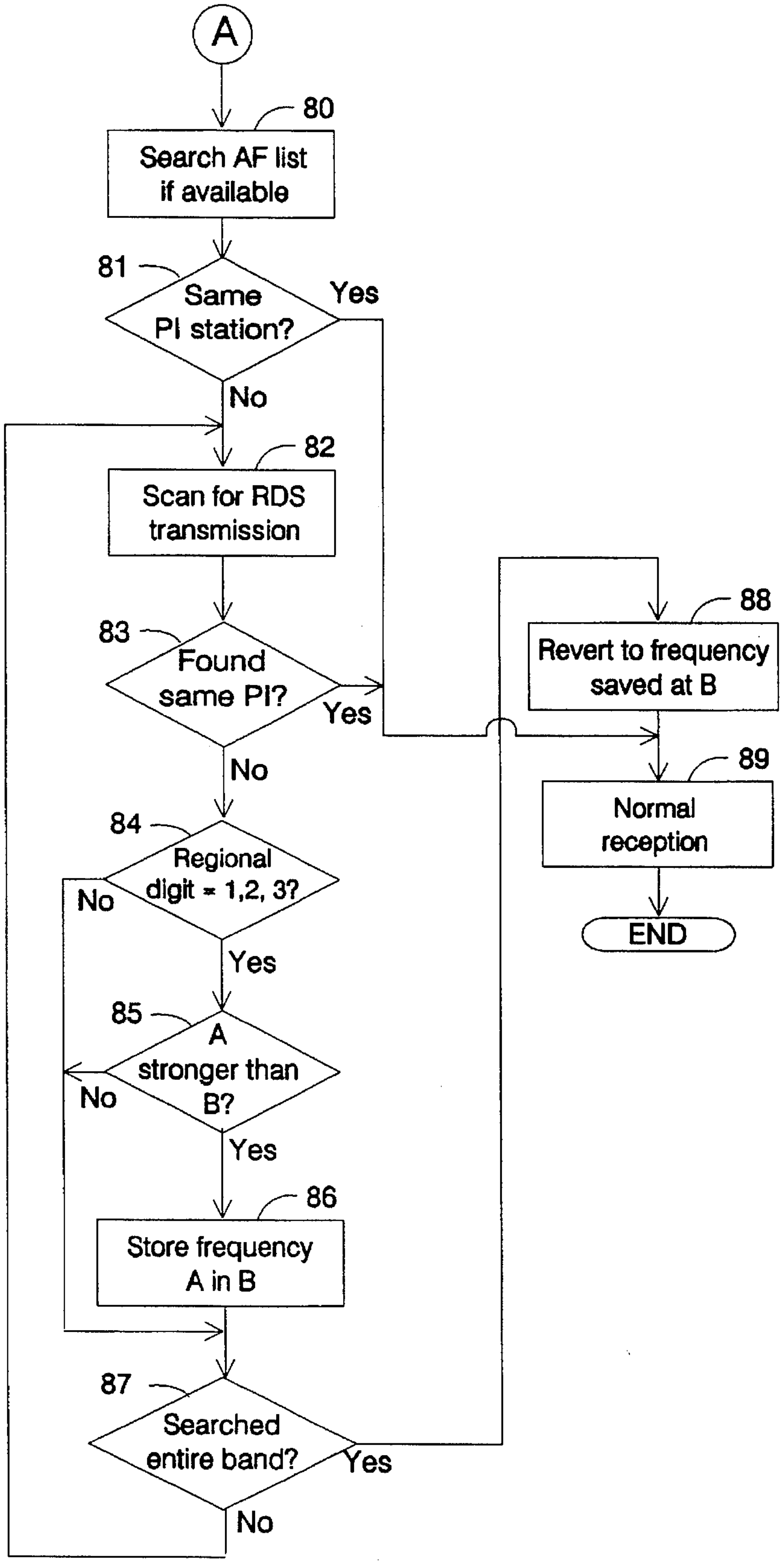
FIG. 9 is a flowchart showing a portion of the operating sequence of the receiver of FIG. 1 according to still another embodiment of the present invention in which the receiver searches for an alternative broadcast if it can't find one with an identical PI code.

Referring to FIG. 9, if there is an AF list memory, the AF list memory is searched in step 80. If a signal is found in step 81, which has a PI code identical to that of the station received prior to activation of the PTY interrupt mode, control proceeds to step 89 where the matching signal is received. If no match is found, control proceeds to step 82.

At step 82, the FM band is scanned for an RDS station. Control proceeds to step 83 where the PI code of the new station is compared to that of that of the station received prior to activation of the PTY interrupt mode. If a match is found, control branches to step 89 where the matching station is tuned in. If no match is found in step 83, control proceeds to step 84 where it is determined if a regional digit of the signal is one of 1, 2 and 3. The regional digit is embedded in the RDS data of the signal being received. If the regional digit is the same, the signal strength at the previous frequency B is compared to that at the new frequency A in step 85. If the regional digit is different, control advances to step 87. At step 85, if the strength of the signal at frequency A is higher, control proceeds to step 86 where the new frequency data are stored in memory location B. If the strength of the new frequency signal is lower than that of the signal stored at B, control proceeds to step 87. Step 87 returns to step 82 and the previous steps between 82 and 87 are repeated. These steps continue to be repeated for each new station until, either a matching PI code is found at step 83, or a scanning of the entire FM band is found to be completed in step 87. If the scanning of the FM band is completed without finding a matching PI code in step 83, control proceeds from step 87 to step 88. In step 88, the frequency stored in memory location B, is tuned in. The frequency stored in memory location B is either the frequency being received when the PTY interrupt mode was activated or a new frequency. The frequency stored in memory location B is a new frequency if, while cycling through steps 84 through 86, a frequency was found which had the regional digits of 1, 2 or 3 and which had a greater field strength than the original frequency. The frequency at B would then be the frequency of the signal which had the greatest field strength of all such signals. At step 89, normal reception continues.

According to the embodiment of FIG. 9, after the PTY interrupt mode is activated, it is possible to return to the same program being received at the time the PTY interrupt mode is invoked. If that program is not available, the receiver will tune in to the international, national or regional station having the strongest signal.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An RDS receiver, comprising:

means for storing a desired category item;

means for receiving broadcast transmission signals each having a program and a category;

controller means for tuning said means for receiving to receive a first one of said broadcast transmission signals after receiving a second one of said broadcast transmission signals when a category item of said second one of said broadcast transmission signals matches said stored desired category item;

said controller means including means for activating an interrupt mode of said controller means;

means for deactivating said interrupt mode when a category of said first one of said broadcast transmission signals changes;

said controller means including means for confirming a receivability of said second one of said broadcast transmission signals after a category of said first one of said broadcast transmission signals changes; and said controller means including means for subsequently tuning said means for receiving to receive said second one of said broadcast transmission signals when said receivability is confirmed.

2. Apparatus as in claim 1, further comprising:

means for identifying a program of said second one of said broadcast transmission signals;

means for identifying at least another broadcast transmission signal program;

said another broadcast transmission signal program being contained in a list of data derived from said first one of said broadcast transmission signals; and said controller means including means for tuning said means for receiving to receive said at least another said broadcast transmission signal program when a program of said second one of said broadcast transmission signals matches said at least another of said broadcast transmission signals program.

3. Apparatus as in claim 2, wherein:

said means for controlling includes means for identifying said program of said second one of said broadcast transmission signals;

said means for controlling includes means for consecutively determining programs of others of said broadcast transmission signals; and said means for controlling includes means for tuning said means for receiving to receive one of said programs of said others of said broadcast transmission signals when said one of said programs of said others of said broadcast transmission signals matches said program of said second one of said broadcast transmission signals.

4. Apparatus as in claim 3 wherein:

each of said broadcast signals has a regional digit;

said means for controlling includes means for identifying regional digits of said others of said broadcast transmission signals;

said means for controlling includes means for tuning said means for receiving to receive a strongest one of said others of said broadcast transmission signals when each of said programs of said others of said broadcast transmission signals is different from said program of said second one of said broadcast transmission signals and each of said regional digits is equal to one of a specified group of regional digits; and said means for controlling includes means for receiving said second one of said broadcast transmission signals when each of said other programs is different from said program of said second one of said broadcast transmission signals and each of said regional digits is different from each of said specified group of regional digits.

5. Apparatus as in claim 1, wherein:

said means for controlling includes means for identifying a program of said second one of said broadcast transmission signals;

said means for controlling includes means for consecutively determining programs of others of said broadcast transmission signals; and said means for controlling includes means for tuning said means for receiving to receive one of said programs of said others of said broadcast transmission signals when said one of said programs of said others of said broadcast transmission signals matches said program of said second one of said broadcast transmission signals.

6. A method for controlling a receiver, comprising the steps of:

storing a desired category item;

receiving a first broadcast transmission signal, said first broadcast transmission signal having a program;

storing said first broadcast transmission signal program;

receiving a second broadcast transmission signal having a category matching said stored desired category item;

monitoring said second broadcast transmission signal category;

continuing said receiving of said second broadcast transmission signal while said first broadcast transmission signal category matches said stored desired category item;

confirming a receivability of said first broadcast transmission signal when said first broadcast transmission signal category is different from said desired category item;

receiving said first broadcast transmission signal when said receivability is confirmed; and receiving an alternative broadcast transmission signal when said first broadcast transmission signal when said receivability is unconfirmed.

7. A method as in claim 6 wherein said step of confirming includes the step of:

attempting to read a code incorporated in said first broadcast transmission signal; and said code indicating said first broadcast transmission signal program.

8. A method as in claim 7 wherein said step of receiving an alternative includes the steps of:

scanning a list indicating programs of listed broadcast transmission signals;

said list indicating programs being embedded in said second broadcast transmission signal;

receiving one of said listed broadcast transmission signals when said one of said listed programs matches said first broadcast transmission signal program;

scanning other broadcast transmission signals and receiving one of said others when said one of said others program matches said first broadcast transmission signal program and said one of said listed program is different from said first broadcast transmission signal program; and receiving said first broadcast transmission signal when all of said programs identified in said step of scanning said list indicating program and step of scanning other broadcast transmission signals are different from said first broadcast transmission signal program.

9. A method as in claim 7 wherein said step of receiving an alternative includes the steps of: attempting to read a code incorporated in said first broadcast transmission signal; and said code indicating said first broadcast transmission signal program.

10. A method as in claim 9 wherein said step of receiving an alternative includes the steps of:

scanning a list indicating programs of listed broadcast transmission signals;

said list indicating programs being embedded in said second broadcast transmission signal;

receiving one of said listed broadcast transmission signals when said one of said listed programs matches said first broadcast transmission signal program;

scanning other broadcast transmission signals and receiving one of said others when said one of said others programs matches said first broadcast transmission signal program and said one of said listed programs is different from said first broadcast transmission signal program;

checking the signal strength of said other broadcast transmission signals;

storing a strongest one of said others having a regional digit equal to one of a specified set of regional digits;

receiving said first broadcast transmission signal when all of said programs identified in said step of scanning said list indicating programs and step of scanning said other broadcast transmission signals are different from said first broadcast transmission signal program and each of said other regional digits is different from each of said specified set; and receiving a stored strongest one of said others when all of said programs identified in said step of scanning said list indicating program and step of scanning said other broadcast transmission signals are different from said first broadcast transmission signal program and at least one of said other regional digits matches one of said specified set.

* * * * *